US006497039B1

(12) United States Patent
Wieres et al.

(10) Patent No.: US 6,497,039 B1
(45) Date of Patent: Dec. 24, 2002

(54) METHOD OF PRODUCING AN ENCASED HONEYCOMB BODY

(75) Inventors: Ludwig Wieres, Overath (DE); Ferdi Kurth, Köln (DE); Uwe Siepmann, Köln (DE); Heribert Grewe, Overath (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/627,238

(22) Filed: Jul. 27, 2000

Related U.S. Application Data

(63) Continuation of application No. PCT/EP99/00528, filed on Jan. 27, 1999.

(30) Foreign Application Priority Data

Jan. 27, 1998 (DE) ........................................ 198 03 012
May 22, 1998 (DE) ........................................ 198 23 000

(51) Int. Cl.[7] ................................................ B21D 51/16

(52) U.S. Cl. ................. 29/890; 29/890.054; 29/890.08; 29/522.1; 29/525.14; 29/527.1; 156/293; 156/294; 228/181

(58) Field of Search .............................. 29/890, 890.08, 29/890.03, 890.036, 890.054, 897.2, 421.1, 469, 522.1, 523, 525.14, 527.1; 428/593; 422/180; 427/359, 365, 207.1; 228/181, 183, 184; 156/294, 293

(56) References Cited

U.S. PATENT DOCUMENTS 2,388,911 A * 11/1945 Fink
4,413,587 A * 11/1983 Cook
4,478,671 A * 10/1984 Freeman
5,068,218 A * 11/1991 Nishizawa
5,082,167 A * 1/1992 Sadano et al.
5,104,627 A * 4/1992 Usui et al.
5,145,539 A * 9/1992 Horikawa et al.
5,304,351 A * 4/1994 Tanaka et al.
5,456,890 A * 10/1995 Tsai et al.
5,557,847 A 9/1996 Koshiba et al.
5,593,646 A 1/1997 Koshiba et al.

FOREIGN PATENT DOCUMENTS

| | | |
|---|---|---|
| DE | 29 24 592 | 1/1981 |
| EP | 0 245 738 A1 | 11/1987 |
| EP | 0 590 596 A1 | 4/1994 |
| JP | 06 182 223 | 7/1994 |
| JP | 07 047 285 | 2/1995 |
| WO | WO 89/11938 | 12/1989 |
| WO | WO 93/25339 | 12/1993 |
| WO | WO 94/06594 | 3/1994 |
| WO | WIPO 96/26805 | 9/1996 |

* cited by examiner

*Primary Examiner*—S. Thomas Hughes
*Assistant Examiner*—T. Nguyen
(74) *Attorney, Agent, or Firm*—Laurence A. Greenberg; Werner H. Stemer; Gregory L. Mayback

(57) ABSTRACT

A method of producing an encased honeycombed body, in particular a supporting body of a catalytic converter, includes the steps of producing a honeycombed body by stacking and/or winding sheet metal layers, of which at least some are structured sheet metal layers, so that the honeycomb body has channels through which a fluid can flow. A sleeve is introduced into a tubular jacket. The sleeve is smaller in the axial direction than the axial length of the honeycomb body and the tubular jacket. The sleeve has an outer circumferential surface which substantially bears against a part of the inner wall of the tubular jacket. The honeycomb body is introduced into the tubular jacket and into the sleeve and is connected to the tubular jacket and the sleeve. If required, the tubular jacket may also be connected to the sleeve.

43 Claims, 6 Drawing Sheets

2 10 9 3b 6 1
5 3a 4
7 8

1
2
5
13
10

15
2
5
16
10
14
9
1

22
23
2
22
1
21
21
17
p
18
19
20
19
19

35
34
42
43
37
36
31
44
32
33

41
39
35
40
31
32
33

35
36
34
43
42
37
31
32
36
44
33
37
35
38

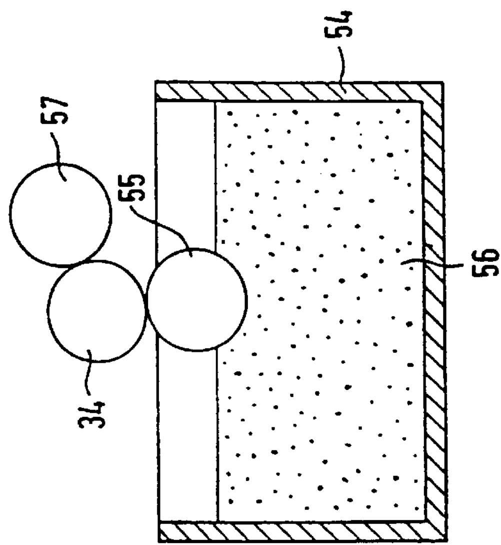
FIG. 14
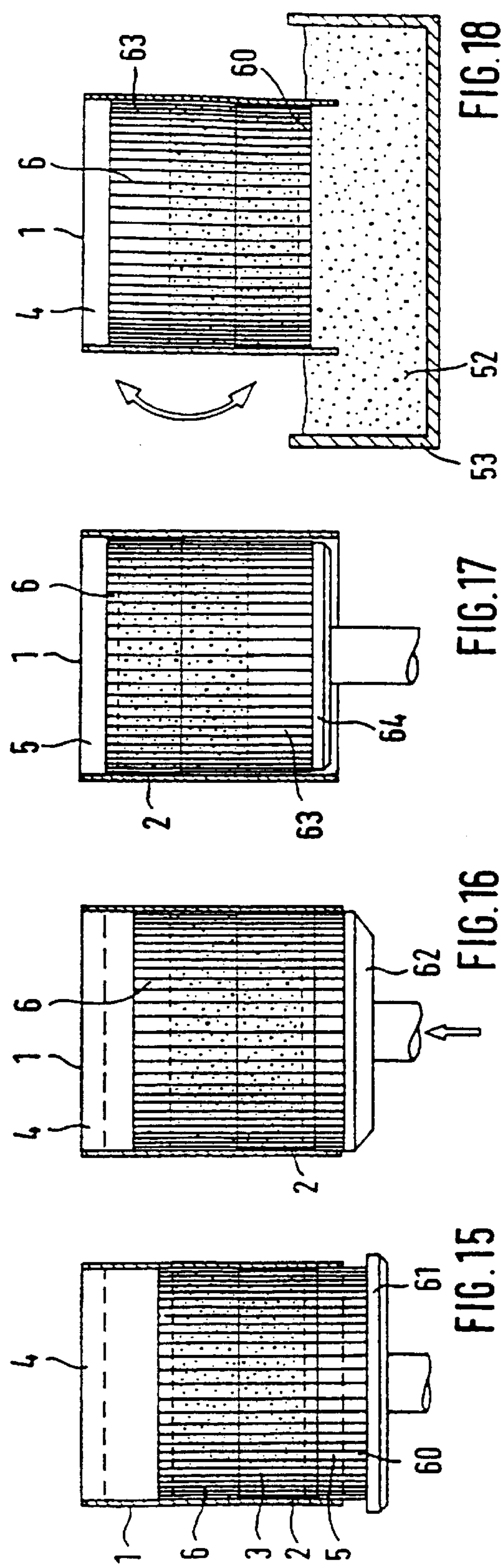
FIG. 15
FIG. 16
FIG. 17
FIG. 18

METHOD OF PRODUCING AN ENCASED HONEYCOMB BODY

CROSS-REFERENCE TO RELATED APPLICATION

This application is a continuation of copending International Application No. PCT/EP99/00528, filed Jan. 27, 1999, which designated the United States.

BACKGROUND OF THE INVENTION

Field of the Invention

The present invention relates to a method of producing an encased honeycomb body.

Honeycomb bodies, which are produced by stacking and/or winding layers of sheet metal, of which at least some are structured layers of sheet metal, are known in a wide variety of forms. Honeycomb bodies including metal sheets are used as so-called support structures for catalytically acting coatings. Support structures of this type, with a catalytically acting coating, are used in motor-vehicle exhaust systems, thereby reducing the emission of certain components of the exhaust gas. Different forms of a configuration as a catalyst support structure are described, for example, in Published European Patent Application EP-A1-0 245 738.

The stacked and/or wound layers of sheet metal are at least partially soldered to one another, so that the honeycomb body is a monolithic structure. The honeycomb body is also soldered to the tubular jacket in which the honeycomb body is located. Soldering of the layers of sheet metal to one another and to the tubular jacket preferably takes place in one soldering operation. Methods of soldering a metallic configuration, including a honeycomb body and a tubular jacket, are known for example from International Publication Nos. WO89/11938, WO94/06594, WO93/25339 and from Published, Non-Prosecuted German Patent Application DE-A-29 24 592.

It is known from the prior art that the honeycomb body is provided at least partially with a bonding agent, to which a soldering powder adheres. The methods known from the prior art differ from one another with respect to the sequence of applying a soldering powder bonding agent, namely during or after the forming of the honeycomb body. A detailed account of the prior art in this respect is includes in International Publication No. WO89/11938.

The various ways of conducting the method with respect to the soldering of a configuration have various advantages. However, for the cost-effective production of a configuration it is desired to obtain a soldering method in which on the one hand a solder is introduced only into the regions in which a soldered connection is to be created, on the other hand the soldering operation is to take place as quickly as possible and with relatively little effort.

If the configuration including a honeycomb body provided in a tubular jacket is used as a catalyst support structure in an exhaust system, this configuration is subjected to thermal loading or stress. The honeycomb body and the tubular jacket have different thermal expansion characteristics on account of their different material properties. It is therefore desirable to avoid a rigid connection between the honeycomb body and the tubular jacket at at least an end region of the honeycomb body. If there are no rigid connections to the tubular jacket in the respective end regions of the honeycomb body, thermal stresses between the tubular jacket and the honeycomb body are avoided.

It is already known from International Publication No. WO96/26805 that thermal stresses can be avoided by a suitable soldering of the honeycomb body to the tubular jacket. According to International Publication No. WO96/26805, it is proposed that at least one layer of sheet metal of the honeycomb body has at least one smooth portion extending from a least one end face over part of the axial length of the honeycomb body and at least partially surrounding the honeycomb body. The smooth portion forms at the periphery of the honeycomb body an outer layer which bears against the tubular jacket. This achieves the effect that, irrespective of the soldering method, no solder gets between the outer layer and the tubular jacket. The solder can therefore be applied in the way known from the prior art. The connection of the honeycomb body to the tubular jacket takes place over part of the axial length of the tubular jacket, the smooth portion extending in the axial direction of the honeycomb body only up to the connecting region between the honeycomb body and the tubular jacket.

On account of production tolerances of the tubular jacket and the honeycomb body, however, it cannot be ensured that no solder will get between the smooth layer and the tubular jacket. To avoid the outer layers of the honeycomb body becoming connected to the tubular jacket, it is already known that the honeycomb body can be soldered through corresponding masks which cover the outer region of the honeycomb body. As a result, a connection of the outer region of the sheet-metal layers to the tubular jacket is avoided. In particular in the case of honeycomb bodies wound in an S-shaped manner, such unconnected outer regions of the layers of sheet metal cause these end regions of the layers of sheet metal to be prone to oscillate during the operation of the catalyst support structure in an exhaust system. The oscillations of the end regions may cause a destruction of the catalytically effective coating of the metallic honeycomb body.

SUMMARY OF THE INVENTION

It is accordingly an object of the invention to provide a method of producing an encased honeycomb body, in particular a catalyst support structure, which overcomes the above-mentioned disadvantages of the heretofore-known methods of this general type.

With the foregoing and other objects in view there is provided, in accordance with the invention, a method of producing an encased honeycomb body, which includes the steps of:

forming a honeycomb body by stacking and/or winding layers of sheet metal and providing at least some of the layers of sheet metal as structured layers of sheet metal such that the honeycomb body is formed with channels for a fluid to flow therethrough;

introducing a sleeve into a tubular jacket and providing the sleeve with an axial extent of less than an axial length of the honeycomb body and of the tubular jacket and providing the sleeve with an outer circumferential surface essentially bearing against a part of an inside wall of the tubular jacket;

introducing the honeycomb body into the tubular jacket and into the sleeve; and forming a connection between the honeycomb body and the tubular jacket and a further connection between the honeycomb body and the sleeve.

In other words, the method according to the invention of producing an encased honeycomb body includes forming a honeycomb body by stacking and/or winding layers of sheet metal, of which at least some are structured layers of sheet metal, so that the honeycomb body has channels through which a fluid can flow. At least one sleeve, which forms a bushing-shaped spacer, is introduced into a provided tubular jacket. The axial extent of the sleeve is less than the axial length of the honeycomb body and of the tubular jacket; the sleeve is preferably introduced in the region of one end face of the tubular jacket. The honeycomb body is introduced into the tubular jacket prepared in this way. The honeycomb body overlaps the tubular jacket and the sleeve. This is followed by forming a connection between the honeycomb body, the tubular jacket and the sleeve, so that the honeycomb body is connected to the tubular jacket and the sleeve. If appropriate, a connection is also formed between the tubular jacket and the sleeve. The sleeve prevents the end regions of the honeycomb body from being connected directly to the tubular jacket. The fact that the honeycomb body is connected to the sleeve achieves the effect that the sleeve forms a compensating element, compensating for the different thermal expansions of the tubular jacket and honeycomb body, and a rigid connection with the tubular jacket is not created in the at least one end region of the honeycomb body.

For technical production-related reasons, a tubular jacket has a certain circularity error with regard to it roundness. There are also tolerances with regard to the variations of an inside diameter of the jacket. As a result of this, a gap may form between the inside wall of the tubular jacket and the sleeve. To avoid solder getting into this gap, and thus creating a rigid connection between the sleeve and the tubular jacket, according to an advantageous mode of the method according to the invention it is proposed that the sleeve is pressed against the inside wall of the tubular jacket. This compensates for possible production tolerances of the tubular jacket and/or the sleeve. The pressing operation causes the spacer to undergo an expansion, if the sleeve is of an essentially tubular configuration, so that the sleeve hugs the inside wall of the tubular jacket. Consequently, between the sleeve and the inside wall of the tubular jacket there is no gap, which may cause problems and into which solder can get.

The sleeve may be of a one-piece configuration. The sleeve is preferably of a bushing-shaped configuration, so that the sleeve extends over the entire periphery or circumference of the inside wall of the tubular jacket. The sleeve may also be divided. If the sleeve is divided, the end portions of the sleeve preferably overlap, wherein the pressing of the sleeve in the radial direction against the inside wall of the tubular jacket also ensures that no solder can get between the sleeve and the tubular jacket in the overlapping end portions of the sleeve either.

Pressing of the sleeve may be so intense that the sleeve is undetachably connected to the tubular jacket. This has the advantage that the tubular jacket is easier to handle with the spacer, since the spacer cannot fall out of the tubular jacket.

According to a further advantageous mode of the method according to the invention, it is proposed that a pressing of the sleeve against the inside wall of the tubular jacket preferably takes place through the use of a mechanical pressing unit. The pressing unit preferably has a mandrel, for example an expanding mandrel, which can be introduced into the tubular jacket in which the sleeve has already been positioned. The sleeve is pressed by the mandrel against the inside wall of the tubular jacket.

Instead of an expanding mandrel, the pressing unit may apply the necessary force or the necessary pressure for pressing the sleeve against the inside wall of the tubular jacket, wherein the pressing unit has at least two radially movable segments, by which the sleeve is pressed against the inside wall. The segments may be moved radially outward through the use of a suitable ram. The advantage of this way of conducting the method is that a pressing unit for tubular jackets of different diameters can be used.

According to a further advantageous mode of the method according to the invention, it is proposed that a pressure unit is introduced into the tubular jacket and a pressure medium is directed through the pressure unit essentially radially outward against the sleeve. The sleeve is pressed against the inside wall by the pressure medium. The advantage is that the sleeve is subjected to pressure over essentially its full surface area, so that it is pressed against the inside wall of the tubular jacket.

To avoid losses of the pressure medium, according to a further advantageous mode of the invention, it is proposed that two peripheral seals are brought to bear against the sleeve. The seals are provided spaced apart from each other. The distance between the seals corresponds at most to a width of the sleeve. The seals are preferably 0-ring seals. Between the seals, at least one outlet opening for the pressure medium is provided.

The tubular jacket is preferably subjected to internal pressure through the use of a gas, with the sleeve provided in the tubular jacket. The gas is preferably air.

According to yet a further advantageous mode of the invention, it is proposed that the pressure medium is a liquid, in particular water.

By a suitable monitoring of the internal pressure or the pressure of the pressure medium, it can also be checked whether the tubular jacket is impermeable, ice. without leaks.

The pressing of the sleeve against the inside wall of the tubular jacket also achieves the effect of calibrating the diameter of the tubular jacket. This also has the advantage that possible production tolerances of the tubular jacket are eliminated, so that the tubular jacket can be connected more easily to neighboring components of an exhaust system.

According to a further advantageous mode of the invention, it is proposed that the sleeve is connected to the tubular jacket. The forming of a connection between the sleeve and the tubular jacket has the advantage that, when the honeycomb body is introduced into the tubular jacket and into the sleeve, the latter retains a predetermined position within the tubular jacket, even though the honeycomb body is pressed in the axial direction of the tubular jacket, and consequently also of the sleeve, and, as a result, exerts a force on the sleeve in the direction in which the honeycomb body is introduced.

The sleeve is preferably connected to the tubular jacket through the use of a material. A welded connection is preferred in this case. The sleeve may be connected to the tubular jacket in a punctiform manner by welding spots. Individual, essentially peripheral weld seams may also be formed.

In order to fix the sleeve within the tubular jacket, it is proposed that the spacer is connected to the tubular jacket through the use of a bonding agent or an adhesive agent. The bonding agent may be introduced in certain portions between the sleeve and the tubular jacket. The bonding agent is preferably introduced over the entire periphery of the sleeve. The bonding agent is preferably an adhesive or oil. The fact that the sleeve is pressed against the inside wall of the tubular jacket means that adhesives which only achieve their adhesiveness under increased pressure can also be used.

Alternatively or additionally, the sleeve may be adhesively bonded to the tubular jacket. The connection between the sleeve and the tubular jacket is preferably configured in such a way that the strength of the connection is less than the strength of a connection between the sleeve and the honeycomb body. In particular in the case of an adhesive connection between the sleeve and the tubular jacket, it may be possible for this connection to be released, for example, during a soldering process due to the temperatures prevailing in the soldering process.

The fact that the connection between the sleeve and the tubular jacket has a lower strength than the connection between the sleeve and the honeycomb body also ensures that thermal stresses between the tubular jacket and the honeycomb body are not introduced into the honeycomb body via the sleeve.

The sleeve is preferably produced from the same material as the honeycomb body or the tubular jacket. The connection between the sleeve and the tubular jacket is essentially an assembly connection, by which it is intended to ensure that the sleeve does not change its position within the tubular jacket during assembly, i.e. while the honeycomb body is being introduced into the tubular jacket.

The sleeve may be soldered, in particular hard-soldered, to the tubular jacket. In order to solder an axial subregion or partial region of the tubular jacket to the sleeve, soldering portions or soldering regions may be provided, which do not necessarily extend around the full periphery or circumference between the sleeve and the tubular jacket.

The connection of the individual layers of sheet metal of the honeycomb body to one another and the connection of the honeycomb body to the tubular jacket preferably takes place by one soldering operation. For soldering the configuration formed by the honeycomb body and the tubular jacket, according to a further advantageous mode of the invention, it is proposed that firstly at least one end face of the honeycomb body is brought into contact with a roller which contains a bonding agent and can be rotated about a roller axis.

The honeycomb body and the roller are moved in relation to each other in such a way that the roller rolls on at least a part of the end face of the honeycomb body and discharges or releases a bonding agent onto the honeycomb body during the rolling operation. After that, a solder is introduced at least into the honeycomb body.

This advantageous mode of the invention achieves a uniform application of a bonding agent to or into the honeycomb body. A possible unevennesses in the end face of the honeycomb body, attributable to an offset between layers of sheet metal of the honeycomb body, do not adversely affect the application of the bonding agent. The fact that the roller rolls on the end face means that wearing of the roller is also reduced, since it is not always the same locations of the roller that come into contact with the relatively thin edges of the layers of sheet metal. As a result, the service life of a device suitable for carrying out the method is also prolonged.

For applying the bonding agent, the honeycomb body and the roller may be moved. As a result, rapid application of a bonding agent is achieved if the roller and the honeycomb body are moved in a translational manner in opposed directions. To simplify the method, it is proposed that either the honeycomb body or the roller is positioned such that it is fixed in place and the roller or the honeycomb body is moved.

In the case of a honeycomb body which has at least one end region which protrudes from the tubular jacket and is of a rotationally symmetrical form with respect to a longitudinal axis of the honeycomb body, it is proposed that the honeycomb body is turned about its longitudinal axis and the roller, which has a shape adapted to the end region and extends radially inward only as far as the longitudinal axis, is turned about a roller axis intersecting the longitudinal axis at an angle of about 90°. By conducting the method in this way, the roller is brought into contact with the surface of the protruding end region.

A honeycomb body may be repeatedly brought into contact with the roller by its end face. Before a renewed contacting with the roller, it is expedient to pivot the honeycomb body by a prescribed angle about the longitudinal axis. As a result, the roller passes repeatedly over the end face of the honeycomb body, so that a very uniform application of a bonding agent is achieved.

For certain applications, it is not necessary for all the layers of sheet metal of the honeycomb body to be provided with a bonding agent. To apply a bonding agent to the end face of the honeycomb body only in certain regions, it is proposed that the roller has the bonding agent only in certain regions. This may be achieved, for example, by a corresponding shaping of the roller. By performing the method in this way, it is not necessary, for example, to interpose gluing masks.

According to yet a further advantageous mode of the invention, it is proposed that the honeycomb body is provided essentially vertically and the roller is brought into contact with an upper end face of the honeycomb body. The relative movement between the honeycomb body and the roller achieves the effect that the bonding agent does not drip into the honeycomb body.

In particular when low-viscosity bonding agents are used, it is expedient to provide the honeycomb body essentially vertically and to bring the roller into contact with a lower end face of the honeycomb body, thus dripping of the bonding agent into the honeycomb body is avoided.

According to yet a further advantageous mode of the invention, it is proposed that a honeycomb body which has two opposite end faces is brought between two spaced-apart, rotatably mounted rollers, so that the two end faces are wetted with a bonding agent essentially simultaneously.

A configuration which includes a honeycomb body provided in a tubular jacket may also be configured in such a way that the tubular jacket protrudes over the honeycomb body at least in an outer portion. In other words, the honeycomb body is provided in the tubular jacket in such a way that at least one end face of the honeycomb body is at a distance from the neighboring end face of the tubular jacket.

Such protruding outer portions of the tubular jacket form connecting regions, so that the configuration can be connected to further components or elements. For example, when using such a configuration in an exhaust system, on the one connecting region of the tubular jacket there may be provided a diffuser, which is connected for example to an exhaust pipe of an exhaust system of an internal combustion engine. It is also known for the tubular jacket to have two connecting regions, which are formed at the respective end of the tubular jacket, with essentially no honeycomb body provided in these connecting regions.

If, for example, the method of connecting the honeycomb body to the tubular jacket known from Published, Non-Prosecuted German Patent Application DE-29 24 592 A1 is used, in which the honeycomb body with the tubular jacket is dipped into a dipping bath containing a bonding liquid and is subsequently provided with powdered solder, the connecting regions of the tubular jacket are also soldered, without this being necessary or desired. The connecting regions are provided with the bonding agent not only on an inner surface of the tubular jacket but also on an outer surface of the tubular jacket. This is undesired, since it causes entrainment of the bonding agent. In particular, the handling devices which engage an outer surface of the tubular jacket are also brought into contact with the bonding agent. A considerable cleaning effort may be necessary for the handling device.

The further methods described in Published, Non-Prosecuted German Patent Application DE-29 24 592 A1 are in principle suitable for achieving a soldering of a tubular jacket and a honeycomb body, but these soldering methods are relatively complicated.

For soldering a honeycomb body in a tubular jacket, in a further advantageous mode of the invention, it is proposed that firstly a honeycomb body is formed by stacking and/or winding layers of sheet metal, of which at least some are structured layers of sheet metal, in such a way that the honeycomb body has channels through which a fluid can flow. The honeycomb body is introduced partially into the tubular jacket. The portion of the honeycomb body protruding from the tubular jacket is brought into contact by its end face with the roller containing a bonding agent. After that, the honeycomb body is introduced into the tubular jacket and a solder is introduced into the honeycomb body.

The fact that only the portion of the honeycomb body protruding from the tubular jacket is brought into contact with a bonding agent avoids the tubular jacket also coming into contact with the bonding agent. This achieves the effect that the tubular jacket is free of bonding agent, such that the soldering powder does not adhere to the tubular jacket.

Since the tubular jacket is not provided with a bonding agent, it is also not necessary to free this tubular jacket of any bonding agent in order to avoid entrainment of the bonding agent.

The fact that the portion protruding from the tubular jacket is brought into contact with a bonding agent, such that the honeycomb body is provided with the bonding agent at least partially in its axial direction, also achieves the effect that the honeycomb body is provided with the bonding agent over its entire cross-sectional area, so that even outer regions of the honeycomb body can be satisfactorily provided with a soldering powder. This ensures that a reliable soldered connection can be formed even in the outer region of the honeycomb body or between the honeycomb body and the sleeve.

According to yet a further advantageous mode of the invention, it is proposed that, before introducing the solder, a portion of the honeycomb body lying opposite therefore mentioned portion is brought into contact with a bonding agent. In particular in the case of a configuration which has a tubular jacket, the tubular jacket having a connecting region respectively at the opposite end portions, it is proposed that the honeycomb body is pushed through the tubular jacket, so that a portion protrudes from the tubular jacket. This portion is brought into contact with the bonding agent. After that, the honeycomb body is introduced into the tubular jacket in such a way that the honeycomb body essentially does not lie in the connecting regions of the tubular jacket.

For stable handling of the configuration, it is proposed that the honeycomb body is introduced into the tubular jacket in such a way that it is located in the tubular jacket over a significant part of its axial length while one or the other portion is being brought into contact with the bonding agent. As a result, the configuration has a favorably located center of gravity, which prevents tipping over of the configuration.

In particular, it is proposed that the honeycomb body is introduced into the tubular jacket in such a way that it protrudes at least 1 mm, preferably 5 mm, from the tubular jacket. This extent is adequate to prevent the tubular jacket from also coming into contact with the bonding agent.

According to a further advantageous mode of the invention, it is proposed that the portion to be wetted with a bonding agent is brought into contact with an application device which contains the bonding agent, the application device having a wetting surface which is larger than an end face of the portion and completely overlaps the latter. This advantageous mode of the invention achieves the effect that the portion of the honeycomb body can be brought into contact with a bonding agent over its entire cross-sectional area. The advantage of this way of conducting the method can also be seen in the fact that the same application device can be used for wetting honeycomb bodies which have different cross-sectional areas. It is therefore not necessary to adapt the application device to different cross-sectional geometries of honeycomb bodies.

The configuration is advantageously brought into contact with the bonding agent in a vertical position, i.e. the longitudinal axis of the honeycomb body runs essentially vertically. The application device may be provided underneath the honeycomb body for contacting the portion of the honeycomb body. A way of performing the method in which the application device is provided above the tubular jacket and the portion is brought into contact with the application device is preferred.

In the case of such a configuration of the application device, the bonding agent also flows into the portion on account of gravity. Depending on the time during which the portion is in contact with the application device and/or the dwell time of the honeycomb body in this vertical position, the effect can also be achieved that the bonding agent is introduced into the honeycomb body over the entire axial length of the latter or over part of the axial length of the latter. In order to provide the honeycomb body with a bonding agent in regions relevant for a soldered connection over its entire axial length, it is not necessary for it to spend a correspondingly long time at the application device. It is adequate if the portion remains in contact with the application device, in particular with the bonding agent, for as long as it takes for an adequate amount of bonding agent to get into the individual channels of the honeycomb body, so that adequate wetting with the bonding agent of the regions relevant for the formation of a soldered connection takes place. By conducting the method in this way, it is also no longer necessary to bring the honeycomb body into contact with a bonding agent on both sides. In particular, the time which is necessary for transporting the configuration from a wetting station, in which the bonding agent is introduced into the honeycomb body, to a soldering station, in which a soldering powder is introduced into the honeycomb body, can be used for the bonding agent to be transported of its own accord within the honeycomb body if the latter is transported in its vertical position.

In particular in the case of applying a bonding agent through the use of an application device provided above the honeycomb body, it is expedient if the bonding agent carrier or bonding agent support is of an essentially elastic and absorbent form. If, for example, the portion is pressed against the bonding agent carrier which contains the bonding agent, this achieves the effect that the bonding agent emerges from the bonding agent carrier and enters the portion. It is also possible to press the bonding agent carrier against the portion of the honeycomb body. Alternatively, the configuration and the bonding agent carrier may be moved in relation to each other in such a way that they press against each other.

In a serial soldering of honeycomb bodies, the individual honeycomb bodies are successively brought into contact with the bonding agent carrier. If these honeycomb bodies are pressed against the bonding agent carrier, there is the risk of the bonding agent carrier undergoing a loss of structure on account of material fatigue effects, which may have the result that adequate introduction of a bonding agent into the portion does not occur. This may have the effect that adequate bonding agent to which a soldering powder adheres is not made available. In order to ensure that adequate bonding agent can be introduced into the portion of the honeycomb body, it is proposed that contact surfaces of at least two successive configurations that are created during contact of a portion with-the bonding agent carrier or with the bonding agent only partially overlap. This mode of the invention is based on the consideration that the bonding agent carrier is not contacted at the same locations by successive configurations, whereby the bonding agent carrier is at least partially not stressed at the same locations, so that material fatigue of the bonding agent carrier cannot occur, or only after a much longer time.

In order to solder the honeycomb body in an axial subregion or partial region of the tubular jacket and with the bushing-shaped element, it is proposed that at least one soldering region which overlaps the tubular jacket and the element is formed. This is preferably a soldering region that is closed with respect to the peripheral direction of the tubular jacket.

Other features which are considered as characteristic for the invention are set forth in the appended claims.

Although the invention is illustrated and described herein as embodied in a method of producing an encased honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 14 is a diagrammatic, sectional view of an application station;

FIG. 15 is a diagrammatic, sectional view of a honeycomb body configuration with an application device for applying a bonding agent;

FIG. 16 is a diagrammatic, sectional view of a honeycomb body configuration with a ram for introducing the honeycomb body into the tubular jacket;

FIG. 17 is a diagrammatic, sectional view of a honeycomb body configuration with an application device for applying a bonding agent to the honeycomb body;

FIG. 18 is a diagrammatic, sectional view of a honeycomb body configuration with a container for a soldering powder for introducing a solder into the honeycomb body.

DESCRIPTION OF THE PREFERRED EMBODIMENTS

Figure 1:
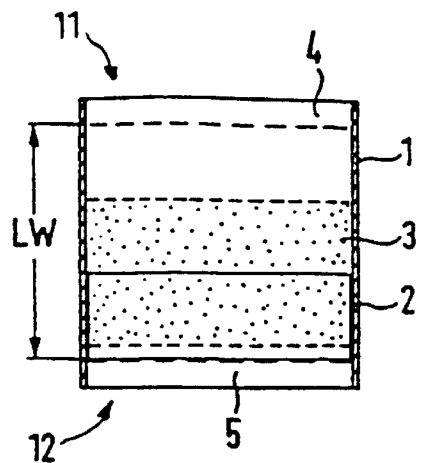
FIG. 1 is a diagrammatic, sectional view of a tubular jacket with a sleeve and a soldering region.

Referring now to the figures of the drawings in detail and first, particularly, to FIG. 1 thereof, there is shown a sectional representation of a tubular jacket 1. The tubular jacket 1 preferably has an essentially circular cross section. Provided at the respective end portions of the tubular jacket 1 represented in FIG. 1 are connecting regions 4, 5. The connecting regions 4, 5 are indicated by the dashed lines. These connecting regions 4, 5 serve for connecting the configuration to further components, which are not represented. In particular, each connecting region 4, 5 may be connected to a component of an exhaust system of an internal combustion engine. The axial portion of the tubular jacket lying between the connecting regions 4, 5 has a length LW, which essentially corresponds to the axial extent of a honeycomb body.

A bushing-shaped sleeve 2 has been introduced into the tubular jacket 1. The reference numeral 3 denotes a soldering portion or soldering region, which partially overlaps the tubular jacket 1 and the bushing-shaped sleeve 2.

Figure 2:
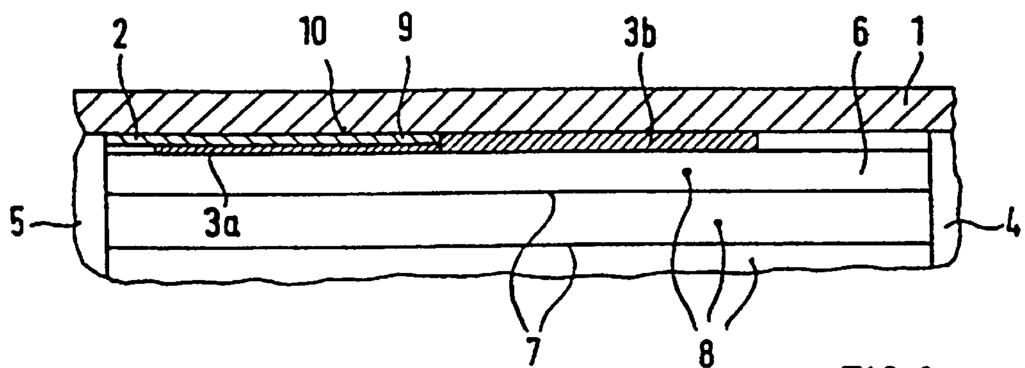
FIG. 2 is an enlarged, partial sectional view of an outer region of a honeycomb body configuration.

FIG. 2 shows an outer region of the configuration on an enlarged scale. A honeycomb body 6 has been introduced into the tubular jacket 1. The honeycomb body 6 is formed by stacking and/or winding layers of sheet metal 7, of which at least some are structured layers of sheet metal. The honeycomb body 6 has channels 8 through which a fluid can flow.

The bushing-shaped sleeve 2 has an outer circumferential surface 9, which bears against part of the inside wall 10 of the tubular jacket 1. The sleeve 2 is of an annular form when viewed in the peripheral direction. As can be seen from the representation in FIG. 1, and in particular according to FIG. 2, the sleeve 2 extends over part of the axial extent of the honeycomb body 6 and the jacket 1.

The sleeve 2 is indirectly connected to the tubular jacket 1. The soldering portion 3 has a first portion 3*a*, which essentially corresponds to the axial extent of the sleeve 2. The soldering portion 3*a* is adjoined by a soldering portion 3*b*, which extends in the direction of the connecting region 4.

The portion 3*a* of the soldering portion 3 provides a soldered connection between the honeycomb body 6 and the sleeve 2. The soldering portion 3*b* connects the honeycomb body 6 to the tubular jacket 1. There is no soldered connection between the sleeve 2 and the tubular jacket 1. At least the axial extent of the sleeve 2 forms a compensating distance, by which it is possible to compensate for the different thermal expansions of the tubular jacket and the honeycomb body 6.

Figure 3:
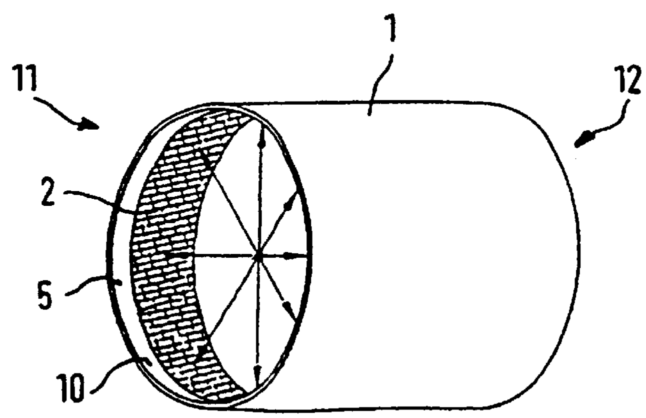
FIG. 3 is a perspective view of a tubular jacket with an annular sleeve.

The sleeve 2 may be introduced into the tubular jacket 1 in the form of a thin-walled tube, as is shown by FIG. 3. After introducing the sleeve 2 into the tubular jacket, the sleeve 2 is pressed radially outward against the inside wall 10 of the tubular jacket 1, so that between the inside wall 10 of the tubular jacket 1 and the sleeve 2 there is no gap into which soldering powder can penetrate.

Pressing of the sleeve 2 radially outward against the inside wall 10 of the tubular jacket 1 may take place, for example, by closing the openings 11, 12 in the tubular jacket 1. A pressure medium is introduced into the tubular jacket 1 and generates in the latter an internal pressure which is high enough for the sleeve 2 to be pressed against the inside wall 10.

Figure 19:
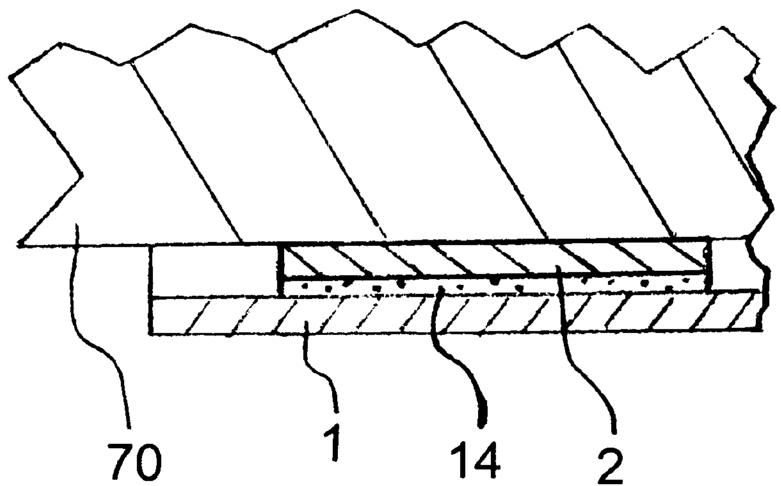
FIG. 19 is a partial sectional view of a pressure element inserted into the tubular jacket.

The sleeve 2 may also be pressed against the inside wall 10 through the use of a mechanical pressing unit. For this purpose, the pressing unit preferably has a mandrel, which can be introduced into the tubular jacket 1 in such a way that it presses the sleeve 2 against the inside wall 10 of the tubular jacket 1. FIG. 19 illustrates in a schematic manner a pressure element 70, which may for example be embodied as a mandrel or as a radially movable segment.

Figure 4:
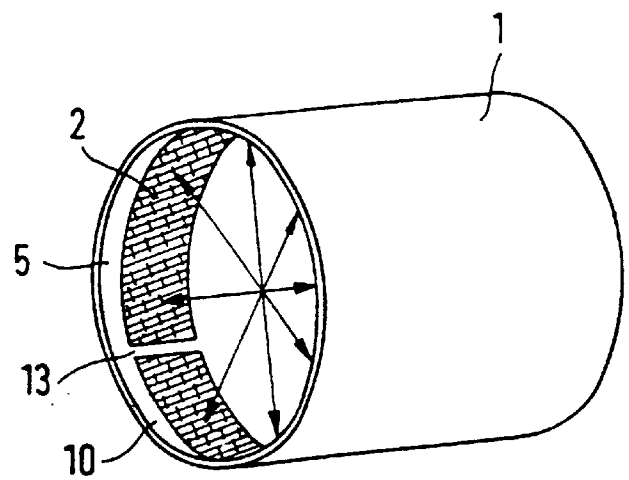
FIG. 4 is a perspective view of a tubular jacket with a sleeve.

FIG. 4 shows a sleeve 2, which is formed by a strip bent in an annular manner. The length of the periphery of the strip is preferably chosen such that, in the pressed state of the sleeve 2, the end faces of the strip butt against each other. Before the pressing of the sleeve 2 in the radial direction against the inside wall 10 of the tubular jacket 1, there may be a gap 13 between the end faces of the strip, as is shown by FIG. 4.

The arrows represented in FIGS. 3 and 4 indicate the pressing direction and the pressing force by which the sleeve 2 is pressed against the inside wall 10 of the tubular jacket 1.

Figure 5:
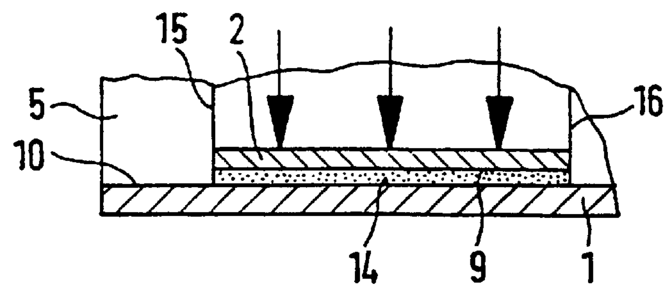
FIG. 5 is a diagrammatic, partial sectional view of a tubular jacket with a sleeve and a bonding agent.

FIG. 5 shows by way of example an exemplary embodiment of a configuration in which a bonding agent or adhesive agent 14 has been introduced between the sleeve 2 and the inside wall 10 of the tubular jacket 1. The bonding agent 14 may be, for example, adhesive or else oil. The bonding agent 14 is applied over the entire outer circumferential surface 9 of the sleeve 2. This is not absolutely necessary, however. Strip-shaped bonding agent regions may also be provided on the outer circumferential surface 9 of the sleeve 2, the bonding agent strips being provided in the region of the respective end face 15, 16 of the sleeve 2.

Figure 6:
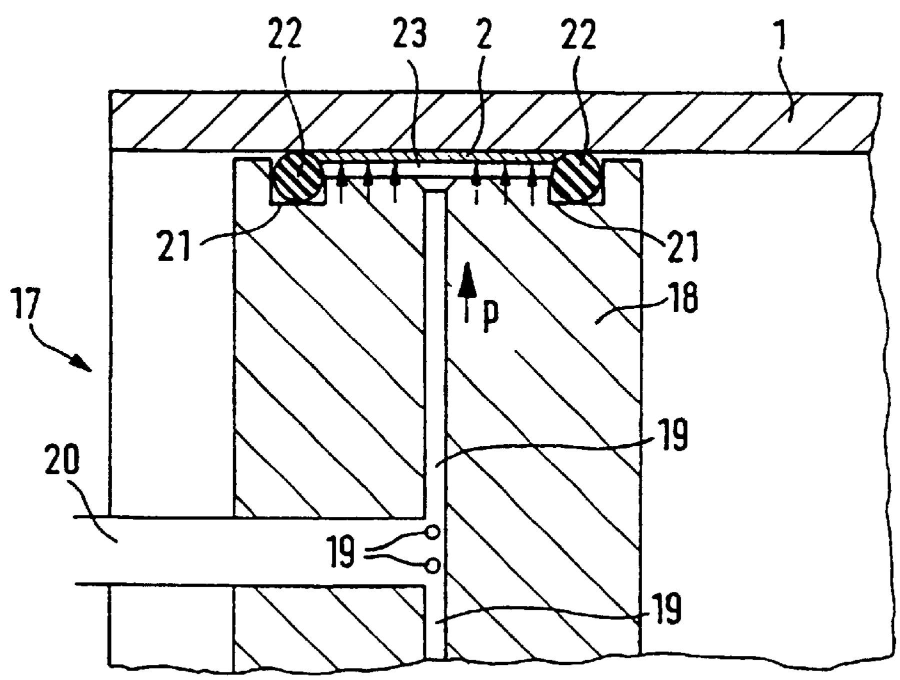
FIG. 6 is a diagrammatic, partial sectional view of a tubular jacket with a pressure unit.

FIG. 6 shows in section a tubular jacket 1, in which a sleeve 2 is provided. A pressure unit 17 is provided in the tubular jacket 1. The pressure unit 17 has a body 18 which preferably has a multiplicity of radially outwardly directed channels 19. The channels 19 are connected to a central channel, which opens out essentially in the center of the body.

In the circumferential surface of the body 18 are two peripheral grooves 21. The grooves are formed in such a way that they are spaced apart from each other. Respectively provided in each groove 21 is a seal 22. The seals 22 are, for example, O-ring seals. The distance between the two seals 22 essentially corresponds to the width of the sleeve 2. The region of the circumferential surface of the body 18 between the seals 22 is formed in such a way that a peripheral annular gap is formed between this circumferential region and the sleeve 2.

A pressure medium is introduced into the channels 19 via the central channel 20. The pressure medium flows into the annular gap 23 and presses the sleeve 2 against the jacket 1.

Figure 7:
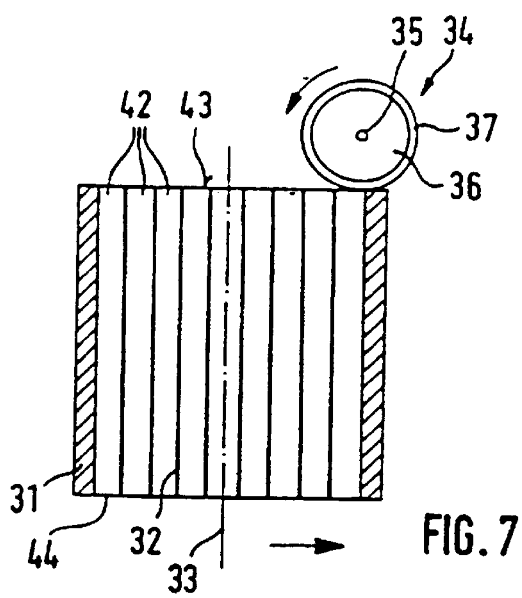
FIG. 7 is a diagrammatic, sectional view of a honeycomb body configuration with a roller.

FIG. 7 shows in section a tubular jacket 31 in which there is a metallic honeycomb body 32, which is formed by stacking (laminating) and/or winding layers of sheet metal, of which at least some are structured. The honeycomb body has channels 42 extending in the longitudinal direction of the honeycomb body. A sleeve is not represented in FIG. 7 or in FIGS. 8 and 9.

The honeycomb body is provided essentially vertically. It has two opposite end faces 43, 44.

The tubular jacket 31 forms a configuration with the honeycomb body 32. A roller 34 is provided above the configuration. The roller 34 is mounted rotatably about a roller axis 35. The roller 34 has a core 36, on which there is formed a substrate 37 which contains a bonding agent.

The application of the bonding agent from the roller 34 into and onto the end face 43 of the honeycomb body 32 takes place by a relative movement between the honeycomb body 32 and the roller 34.

The honeycomb body 32 is moved in a way corresponding to the arrow in FIG. 7, whereby the roller 34 bearing against the end face 43 is set in rotation about its roller axis 35. During this rotation, the substrate 37 with the bonding agent comes to bear against the end face 43 and discharges the bonding agent into the end face 43 of the honeycomb body 32.

The roller 34 may also be driven. The amount of bonding agent discharged can be controlled by the contact pressure between the roller 34 and the configuration. This may also the controlled by the speed of the relative movement between the honeycomb body 32 and the roller 34.

Figure 8:
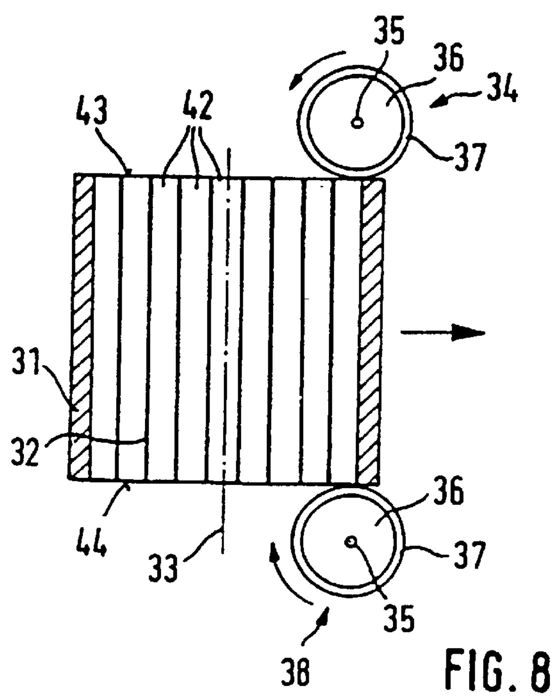
FIG. 8 is a diagrammatic, sectional view of a honeycomb body configuration between two rollers.

FIG. 8 shows a configuration which corresponds to the configuration represented in FIG. 7. The configuration can be moved between two rollers 34, 38, so that the opposite end faces 43, 44 are simultaneously provided with a bonding agent. The amount of bonding agent which the rollers 34, 38 discharge may be the same or may be different. The roller 34 or 38 may also be configured in such a way that, with respect to the axial direction of the roller 34 or 38, there are portions which have no substrate 37, so that a strip-shaped application of a bonding agent is possible.

Figure 9:
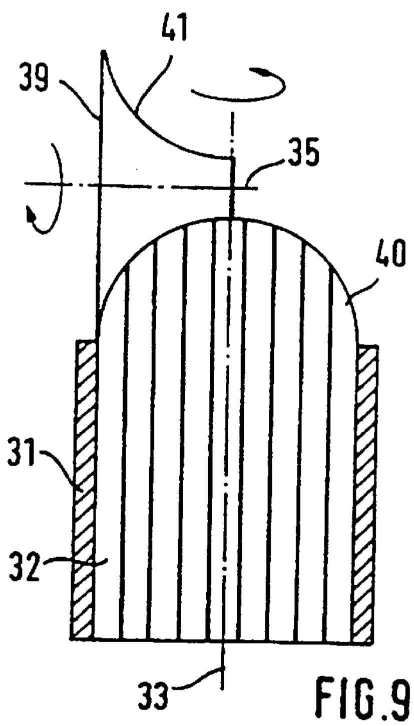
FIG. 9 is a diagrammatic, sectional view of a honeycomb body configuration with an end region protruding from the tubular jacket and a roller.

FIG. 9 shows a honeycomb body 32 which is provided in a tubular jacket 31. The honeycomb body 32 has an end region 40 which is of an essentially rotationally symmetrical form with respect to the longitudinal axis 33. The roller 39 has a contour 41 adapted to the end region.40.

For applying a bonding agent, the roller 39 bears against the end region 40. The roller 39 is in this case provided in such a way that the roller axis 35 and the longitudinal axis 33 intersect at an angle of about 90°. The honeycomb body 32 is turned with the jacket 31 about the axis 33, so that the roller 39 comes to bear against the surface of the end region 40. Alternatively, the configuration including the tubular jacket 31 and the honeycomb body 32 may also be provided such that it is fixed in place. In this case, the roller 39 is set in a rotational movement about the axis 35 and about the longitudinal axis 33. It is also possible to move both the configuration and the roller.

Figure 10:
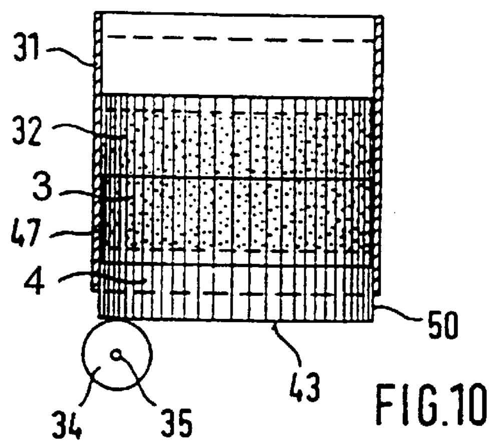
FIG. 10 is a diagrammatic, sectional view of a honeycomb body configuration during application of a bonding agent.

FIG. 10 shows a tubular jacket 31 with which a sleeve-shaped sleeve 47 and a honeycomb body 32 are introduced. The honeycomb body 32 is introduced into the tubular jacket 31 in such a way that a portion 50 protrudes from the tubular jacket 31. The portion 50 of the honeycomb body 32 is brought into contact with a bonding agent, in particular a bonding liquid. The bonding liquid is provided in a roller 34. A wetting of the honeycomb body takes place from the end face in the axial direction of the honeycomb body 32. The roller 34 is configured in such a way that wetting with a bonding agent over the entire end face 43 of the honeycomb body 32 is possible.

Once adequate wetting of the honeycomb body 32 with a bonding liquid has taken place, the honeycomb body 32 is introduced or inserted into the tubular jacket 31. The insertion or introduction of the honeycomb body 32 preferably takes place through the use of a ram 51, by which a force is exerted in the axial direction of the tubular jacket 31 onto the honeycomb body 32. A corresponding stay, which is not represented, acts on the tubular jacket 31 and holds the latter.

Figure 12:
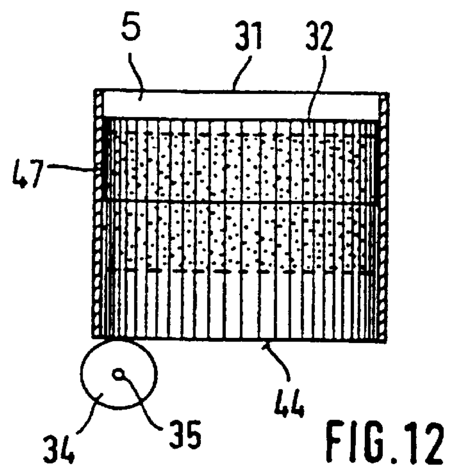
FIG. 12 is a diagrammatic, sectional view of a honeycomb body configuration when a bonding agent is applied to the second portion of the honeycomb body.
Figure 11:
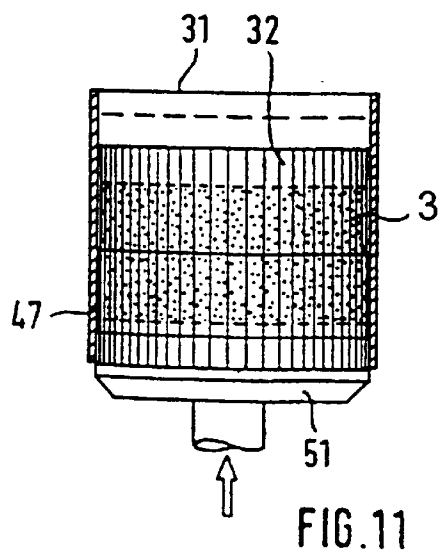
FIG. 11 is a diagrammatic, sectional view of the honeycomb body being introduced into the tubular jacket after application of a bonding agent.
Figure 13:
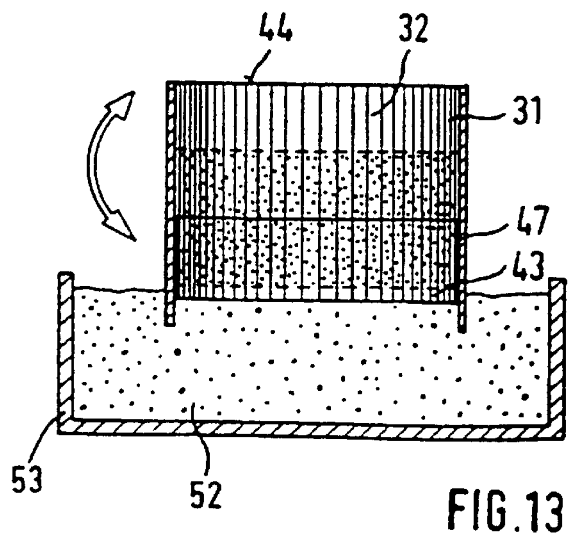
FIG. 13 is a diagrammatic, sectional view of a honeycomb body configuration when a solder is introduced into the honeycomb body.

FIG. 12 shows that, before introducing a solder, the end face 44 of the honeycomb body 32 lying opposite the end face 43 is brought into contact with a bonding agent. The bonding agent is provided by a roller 34.

Once the end face 44 has been provided with the bonding agent, a soldering powder 52 is introduced into the honeycomb body 32. The operation of introducing the solder into the honeycomb body 32 takes place in such a way that the honeycomb body is pressed at its end face into the soldering powder. Subsequently, the honeycomb body with the tubular jacket 31 is turned and the opposite end face is pressed into the soldering powder 52. The soldering powder 52 is provided in a container 53.

FIG. 14 shows an application station, by which a bonding agent 56 is applied from a bonding agent container 54 through the use of an application roller 55 to a roller 34.

The application roller 55 is of an essentially horizontal form. It is rotatably mounted. It protrudes partially into the bonding agent 56. The surface of the application roller 55 is configured in such a way that it takes up the bonding agent 56 from the bonding agent container 54 and transfers it to the roller 34 in contact with the application roller. For stripping off an excess amount of bonding agent, a stripping roller 57, which bears against the roller 34, is provided.

FIG. 15 shows a tubular jacket 1 in section. The tubular jacket 1 preferably has an essentially circular cross section. Connecting regions 4, 5 are formed on the respective end portions of the tubular jacket 1. The connecting regions 4, 5 are indicated by the dashed lines. These connecting regions 4, 5 are provided for connecting the configuration to further components, which are not represented. In particular, each connecting region 4, 5 may be connected to a component of an exhaust system of an internal combustion engine.

The axial portion of the tubular jacket 1 lying between the connecting regions 4, 5 has a length which essentially corresponds to the axial extent of a honeycomb body.

A sleeve 2 has been introduced into the tubular jacket 1. The sleeve 2 has an outer circumferential surface, which essentially comes to bear against part of the inner circumferential surface of the tubular jacket 1, as can be seen in particular from FIG. 2. Considered in the circumferential direction, the sleeve 2 is preferably of an annular form. As can be seen from the representation according to FIG. 2, the sleeve 2 extends over part of the axial extent of the tubular jacket 1.

The sleeve 2 is connected to the tubular jacket 1. Reference numeral 3 denotes a soldering portion which partially overlaps the tubular jacket 1 and the bushing-shaped element 2.

A honeycomb body 6 is introduced into the tubular jacket 1 with the sleeve 2. The honeycomb body 6 is introduced into the tubular jacket 1 in such a way that a portion 60 protrudes from the tubular jacket 1, as can be seen from FIG. 15. The portion 60 of the honeycomb body 6 is brought into contact with a bonding agent, in particular a bonding liquid. The bonding liquid is provided in an application device 61. A wetting of the honeycomb body takes place from the end face in the axial direction of the honeycomb body 6. As can be seen in particular from FIG. 15, the application device 61 is configured in such a way that the bonding agent surface area available is larger than the cross-sectional area of the honeycomb body 6, so that wetting with a bonding agent is possible over the entire cross section of the honeycomb body 6.

Once adequate wetting of the honeycomb body with a bonding agent has taken place, the honeycomb body 6 is introduced into the tubular jacket 1. The introduction of the honeycomb body 6 preferably takes place through the use of a ram 62, by which a force is exerted in the axial direction of the tubular jacket 1 onto the honeycomb body 6. A corresponding stay, which is not represented, acts on the tubular jacket 1 and holds the latter. The honeycomb body 6 is introduced into the tubular jacket 1 to such an extent that the latter lies between the connecting regions 4, 5, as can be seen in particular from FIG. 17.

FIG. 17 shows that, before introducing a solder, a further portion 63 of the honeycomb body 6, lying opposite the portion 60, is brought into contact with a bonding agent. The bonding agent is provided by an application device 64. As can be seen from FIG. 17, the cross section of the application device 64 is somewhat smaller than the cross section of the honeycomb body 6, so that the application device 64 is introduced partially into the tubular jacket 1.

Once the further portion 63 has been provided with the bonding agent, a soldering powder 52 is introduced into the honeycomb body 6. The operation of introducing the solder into the honeycomb body 6 takes place in such a way that the honeycomb body is pressed at its end face into the soldering powder. Subsequently, the honeycomb body with the tubular jacket 1 is turned and the opposite end face is pressed into the soldering powder 52. The soldering powder 52 is provided in a container 53.

We claim:

1. A method of producing an encased honeycomb body, the method which comprises:

forming a honeycomb body by at least one of stacking and winding layers of sheet metal and providing at least some of the layers of sheet metal as structured layers of sheet metal such that the honeycomb body is formed with channels for a fluid to flow therethrough;

introducing a sleeve into a tubular jacket and providing the sleeve with an axial extent of less than an axial length of the honeycomb body and of the tubular jacket and providing the sleeve with an outer circumferential surface essentially bearing against a part of an inside wall of the tubular jacket;

introducing the honeycomb body into the tubular jacket and into the sleeve; and forming a connection between the honeycomb body and the tubular jacket with a first soldering portion and a further connection between the honeycomb body and the sleeve with a second soldering portion.

2. The method according to claim 1, which comprises pressing the sleeve against the inside wall of the tubular jacket.

3. The method according to claim 1, which comprises pressing the sleeve with a mechanical pressing unit against the inside wall of the tubular jacket.

4. The method according to claim 1, which comprises pressing the sleeve with a mandrel of a mechanical pressing unit against the inside wall of the tubular jacket.

5. The method according to claim 1, which comprises pressing the sleeve with at least two radially movable segments of a mechanical pressing unit against the inside wall of the tubular jacket.

6. The method according to claim 1, which comprises:

introducing a pressure unit into the tubular jacket; and directing, with the pressure unit, a pressure medium essentially radially outward against the sleeve such that the sleeve is pressed against the inside wall.

7. The method according to claim 6, which comprises:

providing two peripheral seals such that a distance between the two peripheral seals corresponds at most to a width of the sleeve and such that the two peripheral seals bear against the sleeve; and providing at least one outlet opening for the pressure medium being provided between the two peripheral seals.

8. The method according to claim 6, which comprises introducing a gas into the tubular jacket.

9. The method according to claim 6, which comprises introducing air into the tubular jacket.

10. The method according to claim 7, which comprises introducing a gas into the tubular jacket.

11. The method according to claim 6, which comprises introducing a liquid into the tubular jacket.

12. The method according to claim 6, which comprises introducing water into the tubular jacket.

13. The method according to claim 7, which comprises introducing a liquid into the tubular jacket.

14. The method according to claim 1, which comprises connecting the sleeve to the tubular jacket.

15. The method according to claim 1, which comprises connecting the sleeve to the tubular jacket with a connecting material.

16. The method according to claim 1, which comprises welding the sleeve to the tubular jacket.

17. The method according to claim 1, which comprises adhesively bon ding the sleeve to the tubular jacket .

18. The method according to claim 1, which comprises soldering the sleeve to the tubular jacket.

19. The method according to claim 1, which comprises hards oldering the sleeve to the tubular jacket.

20. The method according to claim 1, which comprises:

providing a roller containing a bonding agent and being rotatable about a roller axis;

bringing an end face of the honeycomb body into contact with the roller, performing a relative movement between the honeycomb body and the roller; and introducing a solder at least into the honeycomb body.

21. The method according to claim 20, which comprises positioning the honeycomb body in a fixed position and moving the roller.

22. The method according to claim 20, which comprises positioning the roller in a fixed position and moving the honeycomb body.

23. The method according to claim 20, which comprises:

providing the honeycomb body with at least one end region protruding from the tubular jacket, the at least one end region being of a rotationally symmetrical form with respect to a longitudinal axis of the honeycomb body;

providing the roller with a shape adapted to the at least one end region and the roller extending radially inward as far as the longitudinal axis of the honeycomb body; and turning the honeycomb body about the longitudinal axis and turning the roller about a roller axis intersecting the longitudinal axis at an angle of about 90°.

24. The method according to claim 20, which comprises providing the bonding agent only in certain regions of the roller.

25. The method according to claim 1, which comprises:

providing a roller containing a bonding agent and being rotatable about a roller axis;

disposing the honeycomb body essentially vertically and bringing the roller into contact with an upper end face of the honeycomb body, performing a relative movement between the honeycomb body and the roller; and introducing a solder at least into the honeycomb body.

26. The method according to claim 1, which comprises:

providing a roller containing a bonding agent and being rotatable about a roller axis;

disposing the honeycomb body essentially vertically and bringing the roller into contact with a lower end face of the honeycomb body, performing a relative movement between the honeycomb body and the roller; and introducing a solder at least into the honeycomb body.

27. The method according to claim 1, which comprises:

providing two spaced-apart, rotatably mounted rollers containing a bonding agent and being rotatatable about respective roller axes; and bringing two opposite end faces of the honeycomb body between the rollers, performing a relative movement between the honeycomb body and the rollers such that the two end faces are wetted essentially simultaneously with the bonding agent.

28. The method according to claim 1, which comprises:

partially introducing the honeycomb body into the tubular jacket;

bringing an end face of a portion of the honeycomb body protruding from the tubular jacket into contact with a bonding agent; and subsequently introducing the honeycomb body into the tubular jacket and introducing a solder at least into the honeycomb body.

29. The method according to claim 28, which comprises bringing a further portion of the honeycomb body into contact with the bonding agent before the solder is introduced at least into the honeycomb body, the further portion being disposed opposite the portion of the honeycomb body.

30. The method according to claim 29, which comprises pushing the honeycomb body through the tubular jacket so that the further portion protrudes from the tubular jacket.

31. The method according to claim 28, which comprises disposing the honeycomb body in the tubular jacket such that the honeycomb body is disposed in the tubular jacket over a significant part of the axial length of the honeycomb body while bringing the end face of the portion into contact with the bonding agent.

32. The method according to claim 29, which comprises disposing the honeycomb body in the tubular jacket such that the honeycomb body is disposed in the tubular jacket over a significant part of the axial length of the honeycomb body while bringing one of the end face of the portion and the further portion of the honeycomb body into contact with the bonding agent.

33. The method according to claim 28, which comprises introducing the honeycomb body into the tubular jacket such that the honeycomb body protrudes at least 1 mm from the tubular jacket.

34. The method according to claim 28, which comprises introducing the honeycomb body into the tubular jacket such that the honeycomb body protrudes substantially 5 mm from the tubular jacket.

35. The method according to claim 28, which comprises bringing the portion of the honeycomb body into contact with an application device containing the bonding agent, the application device having a wetting surface larger than the end face of the portion and completely overlapping the end face.

36. The method according to claim 28, which comprises:

providing an application device containing the bonding agent above the tubular jacket; and positioning the honeycomb body essentially vertically such that the portion of the honeycomb body protruding from the tubular jacket is brought into contact with the application device disposed above the tubular jacket and containing the bonding agent.

37. The method according to claim 28, which comprises pressing at least the portion of the honeycomb body against an essentially elastic bonding agent carrier.

38. The method according to claim 28, which comprises positioning at least one of the honeycomb body and a bonding agent carrier such that respective contact surfaces, created during a contact of the portion of the honeycomb body with one of the bonding agent carrier and the bonding agent, overlap only partially for two subsequent honeycomb bodies to be contacted.

39. The method according to claim 1, which comprises forming at least one soldering region such that the soldering region overlaps the tubular jacket and the sleeve.

40. The method according to claim 1, which comprises forming a connection between the honeycomb body and the tubular jacket and the sleeve and, essentially simultaneously, forming a further connection between the tubular jacket and the sleeve.

41. The method according to claim 1, which comprises using the honeycomb body as a catalyst support structure.

42. The method according to claim 29, which comprises pressing at least the further portion of the honeycomb body against an essentially elastic bonding agent carrier.

43. The method according to claim 29, which comprises positioning at least one of the honeycomb body and a bonding agent carrier such that respective contact surfaces, created during a contact of the further portion of the honeycomb body with one of the bonding agent carrier and the bonding agent, overlap only partially for two subsequent honeycomb bodies to be contacted.

* * * * *